No. 819,930. PATENTED MAY 8, 1906.
F. L. SAWYER & J. H. FULFORD.
BAGGING AND WEIGHING MACHINE.
APPLICATION FILED MAY 25, 1905.
3 SHEETS—SHEET 3.
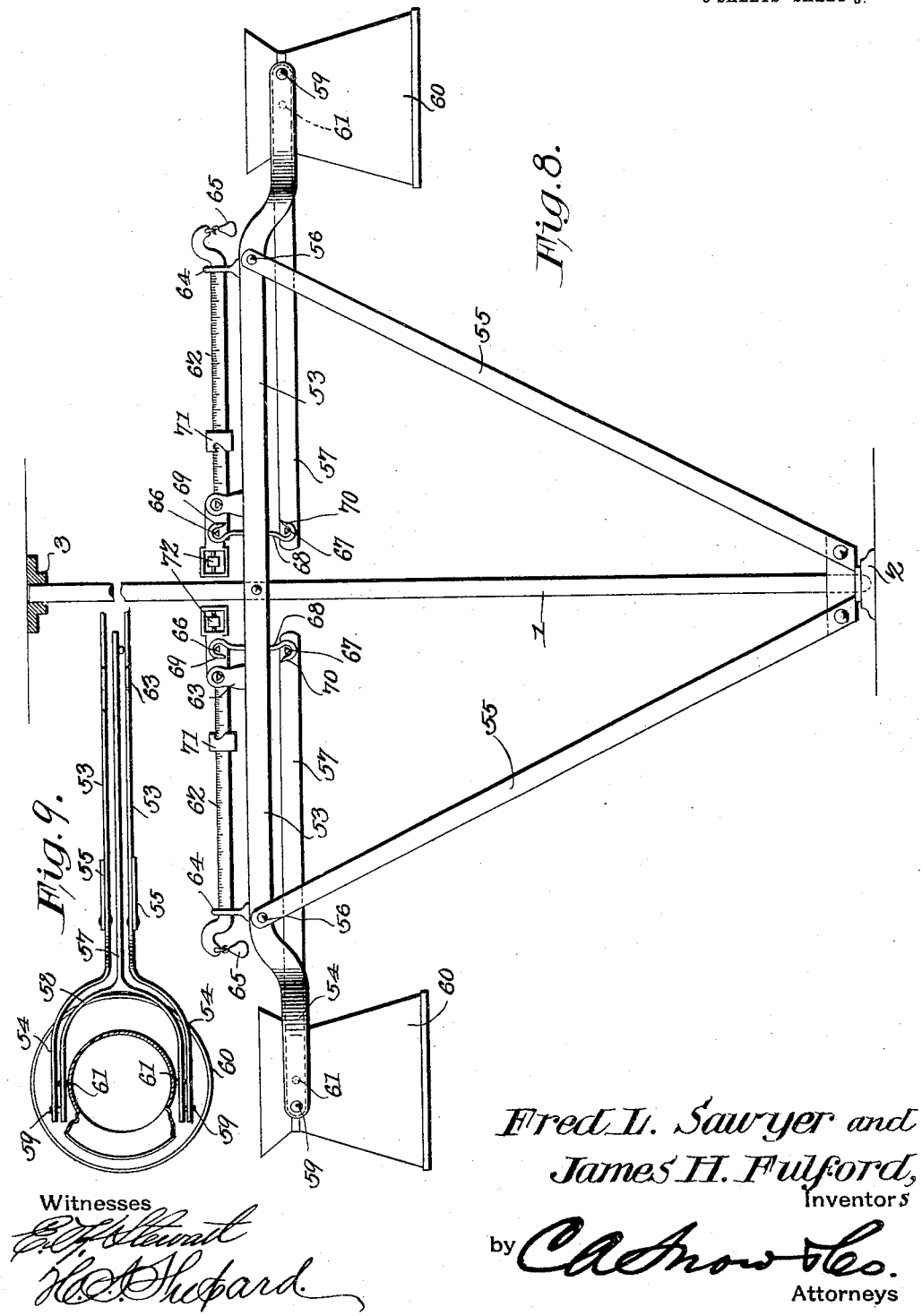

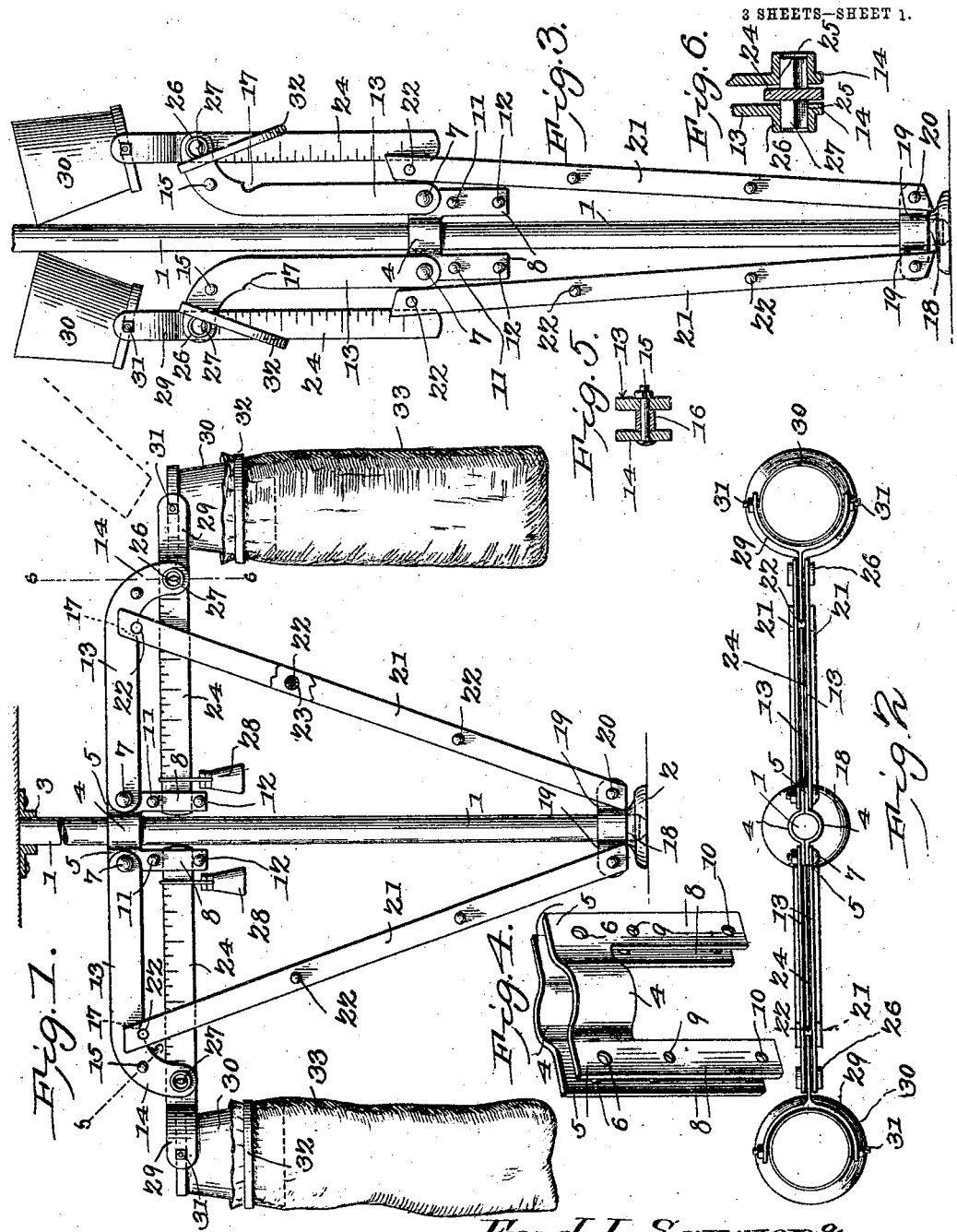

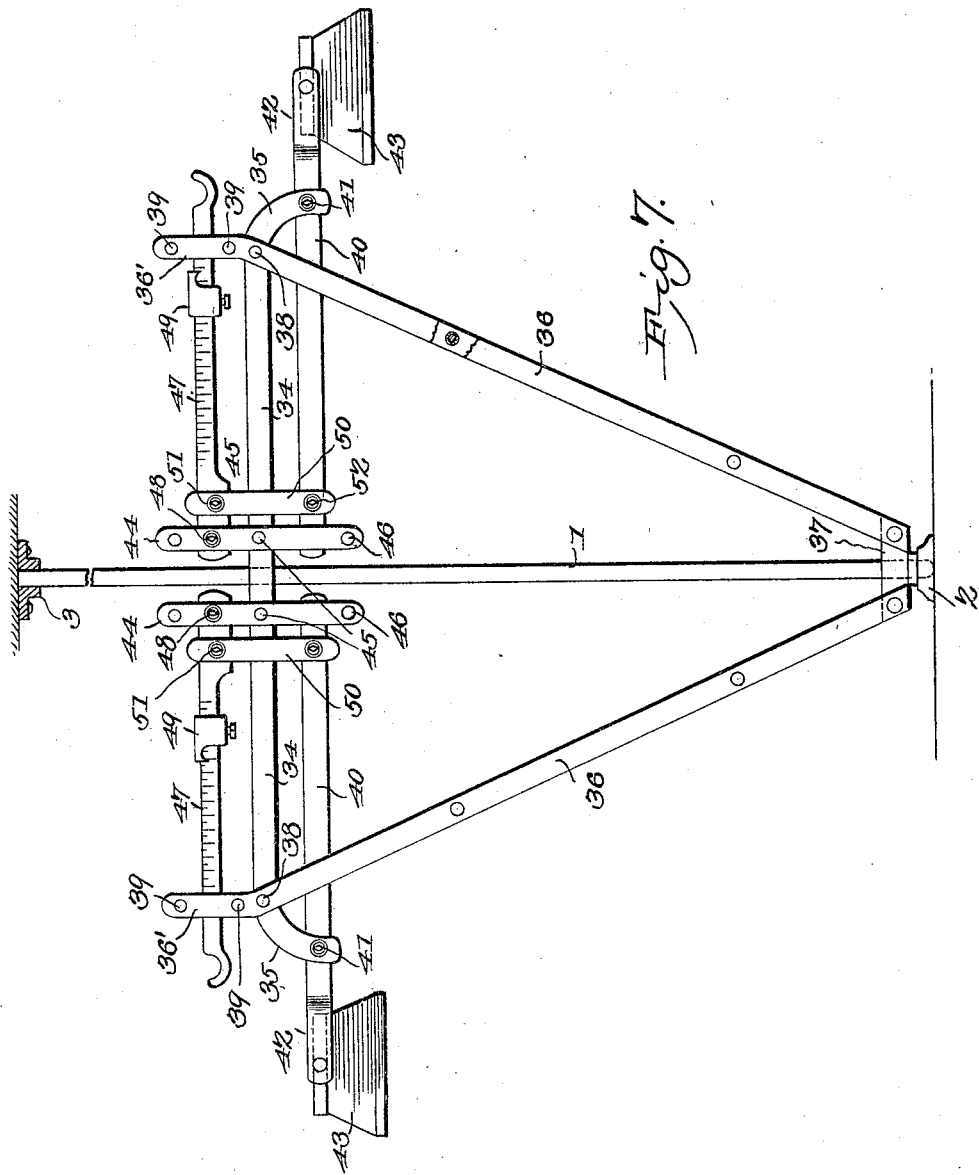

UNITED STATES PATENT OFFICE.

FRED LYMAN SAWYER AND JAMES HENRY FULFORD, OF AMERICUS, GEORGIA.

BAGGING AND WEIGHING MACHINE.

No. 819,930.  Specification of Letters Patent.  Patented May 8, 1906.

Application filed May 25, 1905. Serial No. 262,279.

*To all whom it may concern:*

Be it known that we, FRED LYMAN SAWYER and JAMES HENRY FULFORD, citizens of the United States, residing at Americus, in the county of Sumter and State of Georgia, have invented a new and useful Bagging and Weighing Machine, of which the following is a specification.

This invention relates to combined bagging and weighing machines, and has for its object to provide an improved apparatus of this character which is particularly designed for bagging and weighing grain, cotton-seed, fertilizer, and the like.

It is a further object of the invention to arrange the device so that during the filling and weighing of a bag another filled bag may be removed and an empty bag substituted therefor without interfering with the filling and weighing of the first-mentioned bag and to permit of the device being shifted to bring the empty bag into position for filling and the filled bag into position for removal from the device.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the accompanying drawings, Figure 1 is a side elevation of a combined bagging and weighing device embodying the features of the present invention. Fig. 2 is a top plan view thereof. Fig. 3 is a side elevation of the device in its folded condition. Fig. 4 is a detail perspective view of a bracket employed in the construction of the device. Fig. 5 is an enlarged detail sectional view on the line 5 5 of Fig. 1. Fig. 6 is a detail sectional view on the line 6 6 of Fig. 1. Fig. 7 is a view similar to Fig. 1, showing another embodiment of the invention. Fig. 8 is an elevation of still another embodiment of the invention. Fig. 9 is a detail plan view of one-half of the device with the adjacent scale-beam removed.

Like characters of reference designate corresponding parts in each and every figure of the drawings.

The present device includes an upright standard 1 rising from the stationary base 2, said standard being cylindrical in form with its lower end rotatably stepped within a socket in the base 2, which is fixed upon a floor or other suitable support. The upper end of the standard is rotatably mounted in an overhead bearing 3, whereby the standard is supported at opposite ends and is capable of rotation in its terminal supports.

At a suitable point upon the standard there is a bracket consisting of complementary semicylindrical members 4, which embrace the standard and have corresponding terminal ears 5, which are pierced by registered openings 6 for the reception of fastenings 7, preferably bolts, so as to clamp the bracket members snugly upon the standard. Pendent extensions or hangers 8 depend from the ears 5 and are pierced by upper and lower corresponding openings 9 and 10 for the reception of the pins or bolts 11 and 12, which are designed to operate as stops in a manner as will be hereinafter described. This bracket 4 is designed to support two diametrically opposite arms, each arm consisting of a pair of spaced substantially horizontal duplicate members 13, the inner ends of which embrace the adjacent ears 5 of the bracket and are pivotally connected thereto by means of the fastenings 7. The outer free end of each arm member is extended to form a downturned or elbowed portion 14, and the adjacent elbowed members are connected by a bolt 15, as best shown in Fig. 5 of the drawings, there being a spacing-sleeve 16 embracing the bolt and interposed between the members 14, so as to maintain the latter spaced at the desired interval. In the under edge of each arm 13, near the outer end thereof, there is a notch or seat 17 for a purpose, as will be hereinafter described.

At the bottom of the standard 1 there is a bracket 18, made up of duplicate members substantially as described for the bracket 4, but without the hangers 8 thereof, each bracket member 18 having opposite ears 19 and each pair of adjacent ears being pierced by a bolt or other fastening 20. From this bracket rise two props which lie at opposite sides of the standard and diverge upwardly for the support of the outer ends of the arms 13. Each of these props consists of spaced duplicate members 21, which are connected at intervals by means of bolts 22, each of which is embraced by a sleeve 23 to space the prop members in the manner described for the arms 13. The lower ends of the prop members 21 embrace the adjacent pair of ears 19 of the lower bracket 18 and are pierced by the fastening 20, whereby the prop is pivoted or hinged to the bracket so as to swing toward and away from the standard. Each prop is of a length to have the upper ends of its members embrace one pair of the arms 13, as clearly indicated in Fig. 3 of the drawings, with the uppermost bolt or pin 22 arranged to fit within the adjacent notch or seat 17, and thereby prop the arm 13 in a substantially horizontal position.

A scale-beam 24 is fulcrumed adjacent its outer end between the downturned terminals 14 of the arm members 13. As best indicated in Fig. 6, it will be noted that the free extremities of the arms 13 are provided with corresponding circular openings 25, with a cylindrical flange 26 surrounding each opening upon the outer side of the adjacent arm member, the scale-beam being provided at each side with a diamond-shaped bearing projection 27, constituting the fulcrum of the scale-beam. From this fulcrum the scale-beam extends inwardly between the adjacent prop members and has its inner extremity working between the adjacent pair of hangers 8 and limited in its vertical movement by the stop-pins 11 and 12. A suitable poise 28 is adjustably hung upon the scale-beam in any common or well-known manner and capable of adjustment thereon to counterbalance the outer end of the scale-beam. As clearly indicated in Fig. 3, it will be noted that the outer end of the scale-beam is provided with a substantially horizontal yoke or fork 29, within which is supported an upwardly-tapered hollow hopper 30, which is mounted to swing upon a substantially horizontal axis formed by set-screws 31, which pierce the fork members and engage the top of the hopper. A ring or band 32 surrounds this bag-holder and is designed to embrace the mouth of a bag 33 when the lower end of the bag-holder has been inserted into the bag, the weight of the bag tending to draw downwardly upon the ring, and thereby bind the mouth of the bag between the ring or band and the bag-holder to support the bag upon the holder.

In using the present apparatus after a bag has been fitted to one of the holders the apparatus is swung around upon the standard 1 to bring the bag-holder beneath the filling-spout, one of such spouts being shown in dotted lines at the right-hand side of Fig. 1, whereby grain, meal, fertilizer, cotton-seed, and the like may be quickly run into the bag. During the filling of this bag an empty bag may be engaged with the opposite bag-holder, and after the first-mentioned bag has been filled the apparatus is turned to bring the empty bag beneath the feed-spout and to permit removal of the filling bag. It will of course be understood that during the filling of one bag the weight of the filled bag is determined by means of the scale-beam from which said bag is hung, whereby all parts of the apparatus are simultaneously in use, and the filling and weighing of the bags is carried out in a very simple and expeditious manner without requiring any particular degree of experience or skill.

While only two scale-beams have been shown, it is of course apparent that additional scale-beams may be mounted upon the upper bracket 4 to increase the capacity of the device without departing from the spirit of the present invention.

When the apparatus is not in use, the arms 13 are swung upwardly and inwardly alongside the standard 2, and the props are also swung upwardly and inwardly, as clearly indicated in Fig. 3 of the drawings, whereby the apparatus may be folded into compact form when not in use.

While the construction of the device hereinbefore described is sufficient for the purposes designed, there is also another embodiment of the invention, which has been shown in Fig. 7 of the drawings. In this form of the scale the rotatable standard 1 is preserved with its lower end mounted in the step-bearing 2 and its upper end mounted in the overhead bearing 3. In lieu of the independent foldable arms 13 there is a rigid arm 34 projecting at opposite sides of the standard, this arm of course being made up of a pair of spaced parallel members, with the outer end portion 35 of the arm inclined or turned downwardly. At each side of the standard 1 there is a prop 36, made up of spaced members, with the lower end of the prop connected to the standard 1 by means of a suitable bracket 37. The adjacent outer end portion of the fixed horizontal arm 34 projects between the members of the prop 36 and is connected thereto by a bolt or other rigid connection 38, the upper terminal portion 36' of the prop 36 extending in a vertical direction above the arm 34 and pierced by upper and lower pins 39, constituting stops, as will hereinafter appear. A substantially horizontal balance-bar 40 extends between the members of the prop 36 immediately below the arm 34 and is intermediately fulcrumed upon the downturned outer terminal of the arm 34, as indicated at 41, and terminating at its outer end in a fork 42, in which is pivotally hung a polygonal hopper 43, which is converged upwardly and is open at opposite ends. At the inner end of the balance-bar 40 there is a fixed upright 44, made up of two members embracing the arm 34 and projecting above and below the latter, there being a fastening 45 to rigidly connect the upright to the arm. The rear end of the balance-bar 40 is received between the lower portions of the upright members 44, which therefore constitute a slotted guide for the member 40, there being a stop-pin 46 connecting the lower ends of the upright member 45 and in the downward path of the rear end of the balance-bar 40, so as to limit its downward movement. Above the arm 34 and in substantial parallelism therewith is a scale-beam 47, which has its rear end fulcrumed between the upright members 44, as indicated at 48, with its outer free end portion working between the upstanding portions 36' of the standard 36 and between the stop-pins 39. A suitable slidable poise 49 is mounted upon the scale-beam. From each side of the scale-beam 47 there depends a link 50, located adjacent the upright 44, with its upper portion pivoted to the scale-beam, as at 51, and its lower portion pivoted to the balance-bar 40, as at 52, whereby the balance-bar and the scale-beam are connected for simultaneous movements. In this embodiment of the present invention it will be noted that the weight of a filled bag upon the outer end of the balance-bar 40 tends to elevate the inner end of said bar and through the medium of the link 50 to elevate the scale-beam 47 upon its fulcrum 48, which tendency is offset by adjusting the poise 49 so as to balance the weight of the bag, whereby the poise will indicate upon the scale-beam the weight of the bag.

Still another embodiment of the invention has been shown in Figs. 8 and 9 of the drawings, wherein the standard 1 is retained with its lower end rotatably mounted in a step-bearing 2 and its upper end in the overhead bearing 3. As in the former embodiments, the weighing mechanism of the present embodiment is duplicated at opposite sides of the standard 1, and therefore a description of one of the weighing mechanisms is deemed sufficient. At a suitable distance above the bottom of the standard 1 there is a horizontal arm made up of spaced duplicate members 53, which embrace and project at opposite sides of the standard, to which they are rigidly connected in any suitable manner. At their outer ends the arms 53 are spread to form fork members 54, which are offset downwardly from the main portions of the arms. Each arm member is supported by a brace 55, which is suitably connected to the lower end of the standard and has its upper end connected to the arm, as at 56. Below the arms 53 and opposite the interval therebetween is a substantially horizontal balance-bar 57, which has its outer end provided with a fork 58, lying within the fork members 54, with the outer end portions of the fork 58 pivotally supported upon the outer ends of the respective fork members 54, as shown at 59. Within the fork 58 there is a hopper 60, which is pivotally supported upon the fork, as at 61, in rear of the pivotal connections 59 between the two forks. Above the arms 53 is a substantially horizontal scale-beam 62, which is fulcrumed adjacent its inner or rear end upon bracket members 63, rising from the arms 53, the forward end portion of the scale-beam being received within an upright guide 64, rising from the arms 53 and provided upon its front free end with a pendent pear-shaped weight 65. A triangular bearing projection 66 extends laterally from the scale-beam in rear of the fulcrum thereof, and a similar bearing projection 67 is provided upon the inner or rear end of the bar 57, there being a link 68 having hooked terminals 69 and 70 embracing the respective bearing projections 66 and 67, so as to support the inner or rear end of the bar 57 from the rear end of the scale-beam. A suitable poise 71 is slidably carried by the scale-beam, and at the rear extremity of the scale-beam there is a counterweight 72, adjustable longitudinally of the beam for the purpose of originally obtaining the balance of the scale-beam. This last form of the device is used in the same manner as described for the other form, a bag being suspended from the hopper 60 and the weight of the filled bag determined by means of the scale-beam 62.

Having thus fully described the invention, what is claimed is—

1. A combined bagging and weighing device comprising a rotatable standard, a series of substantially horizontal supports carried by the standard, upwardly-diverged props extending from the standard to the outer end portions of the supports, weighing mechanisms mounted upon the supports, and bag-holders associated with the respective weighing mechanisms and located at the outer ends of the supports.

2. A combined bagging and weighing device comprising a standard, a substantially horizontal support carried by the standard with its outer end provided with a downwardly-offset fork, a scale-beam fulcrumed upon the top of the support, a balance-bar lying beneath the horizontal support with its inner end connected to the scale-beam and its outer end provided with a fork lying within and pivotally connected with the fork of the support, and a bag-holder located within and carried by the fork of the balance-bar.

In testimony that we claim the foregoing as our own we have hereto affixed our signatures in the presence of two witnesses.

FRED LYMAN SAWYER.
JAMES HENRY FULFORD.

Witnesses:
W. T. STANFIELD,
R. E. MCNULTY.